(12) United States Patent
Takahashi et al.

(10) Patent No.: US 6,467,973 B2
(45) Date of Patent: Oct. 22, 2002

(54) OPTICAL FIBER FUSION SPLICER

(75) Inventors: Kenji Takahashi, Sakura (JP);
Noriyuki Kawanishi, Sakura (JP);
Mikio Yoshinuma, Sakura (JP)

(73) Assignee: Fujikura LTD, Tokyo (JP)

( * ) Notice: Subject to any disclaimer, the term of this patent is extended or adjusted under 35 U.S.C. 154(b) by 0 days.

(21) Appl. No.: 09/883,410

(22) Filed: Jun. 18, 2001

(65) Prior Publication Data

US 2001/0053268 A1 Dec. 20, 2001

(30) Foreign Application Priority Data

Jun. 19, 2000 (JP) ........................................ 2000-183593

(51) Int. Cl.⁷ .............................................. G02B 6/255
(52) U.S. Cl. .......................................... 385/96; 385/134
(58) Field of Search .............................. 385/95–99, 134

(56) References Cited

U.S. PATENT DOCUMENTS 4,350,867 A * 9/1982 Kinoshita et al.
6,190,057 B1 * 2/2001 Osaka et al. .................. 385/96

FOREIGN PATENT DOCUMENTS

| JP | 62-210406 | 9/1987 |
| JP | 62-210407 | 9/1987 |
| JP | 62-210408 | 9/1987 |

* cited by examiner

Primary Examiner—Khiem Nguyen
(74) Attorney, Agent, or Firm—Chadbourne & Parke, LLP (57) ABSTRACT

The present invention discloses an optical fiber fusion splicer which, together with fusing and splicing optical fibers in the state in which the jacket of each optical fiber core is clamped by being provided with a means by which a V-shaped groove base is moved up and down so that the axial centers of optical fiber cores are positioned at the proper position for electrical discharge, is provided with a mechanism that temporarily moves clamp upward and V-shaped groove base downward followed by re-clamping in order to eliminate a lift-up phenomenon during rotation alignment of the constant polarization optical fibers.

4 Claims, 6 Drawing Sheets

(RIGHT SIDE V-SHAPED GROOVE BASE)

FIG. 5B (LEFT SIDE V-SHAPED GROOVE BASE)

OPTICAL FIBER FUSION SPLICER

BACKGROUND OF THE INVENTION

1. Field of the Invention

The present invention relates to an optical fiber fusion splicer that axially aligns optical fibers by clamping with a V-shaped groove, and more particularly, to an optical fiber fusion splicer that enables reliable end alignment of the optical fibers without allowing their axial centers to shift from the proper position even if the outer diameters of the optical fibers and jackets change.

2. Description of the Related Art

Figure 3:
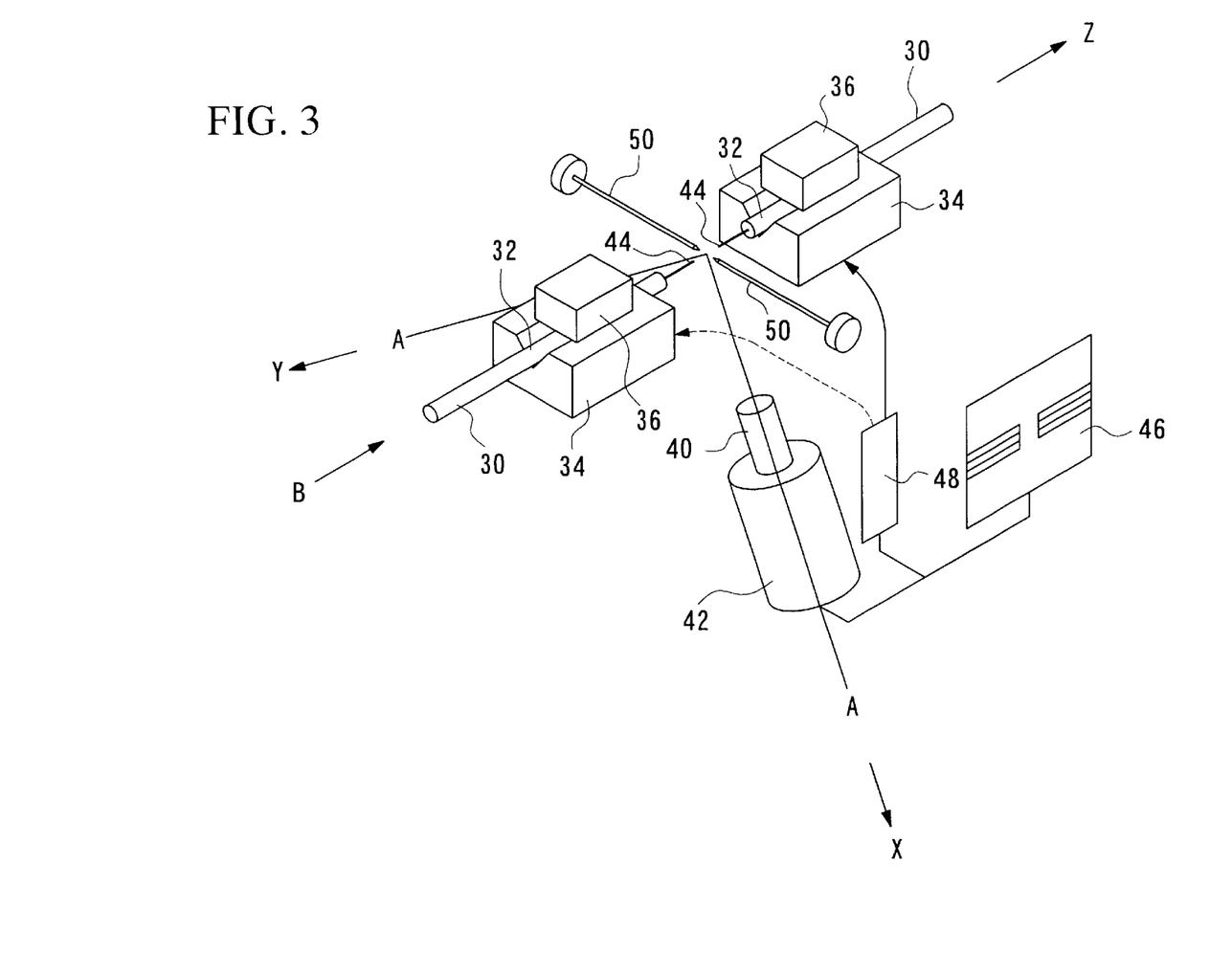
FIG. 3 is a schematic drawing of an optical fiber fusion splicer of the prior art having an observation means.
Figure 4A:
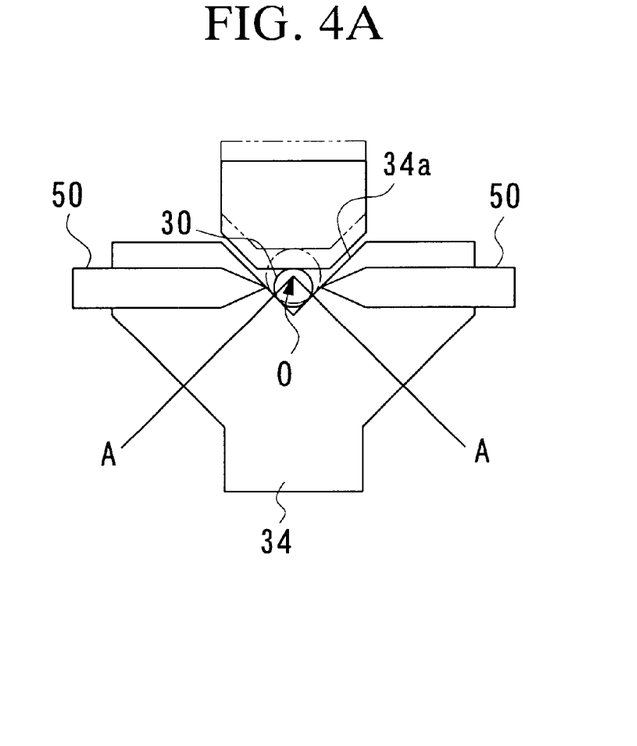
FIG. 4A is a front view of a V-shaped groove that shows the relationship between the electrodes and image observation optical axes of the prior art when the jacket of an optical fiber core having a sheath diameter of 250 μm is clamped on the V-shaped groove base.
Figure 4B:
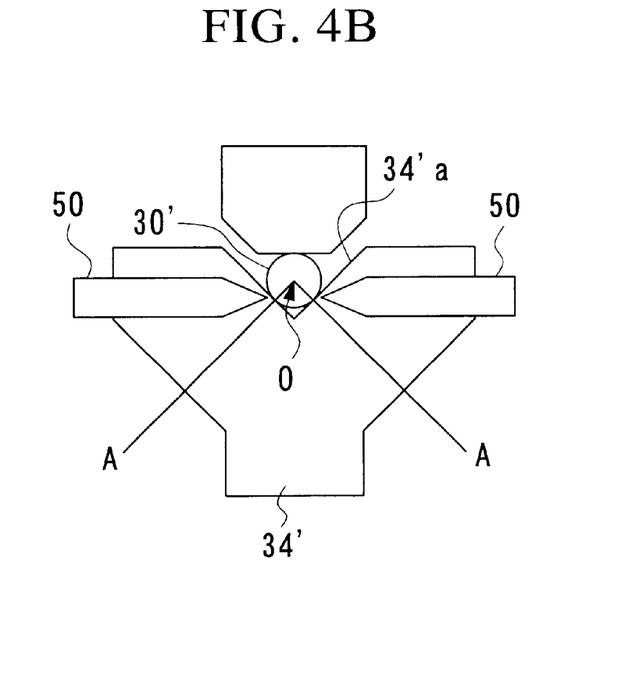
FIG. 4B is a front view of a V-shaped groove that shows the relationship between the electrodes and image observation optical axes of the prior art when the jacket of an optical fiber core having a sheath diameter of 400 μm is clamped on the V-shaped groove base.

FIG. 3 schematically illustrates an optical fiber fusion splicer of the prior art in which the end aligned portions of optical fiber cores are observed from the side by clamping the jackets of optical fiber cores in a V-shaped groove. In FIG. 3, jackets 32 of left and right optical fiber cores 30 are respectively clamped between the a V-shaped groove of a V-shaped groove base 34 and a clamp 36. Axial alignment of the optical fiber cores 30 is performed using an observation means having bi-directional image observation optical axes A that combine a microscope 40 and a TV camera 42 by observing the end aligned portions 44 of the cores on a monitor 46, processing observation information from the two directions with a processor 48, transmitting the output signal to a movement mechanism (not shown) of the V-shaped groove bases 34, moving the V-shaped groove bases 34 to axially align with the two-dimensional X and Y directions at a right angle to the axis of the optical fiber cores 30, advancing in the direction of the cores (Z direction) and then generating an electrical discharge to fuse and splice the cores. In this optical fiber fusion splicer, when the optical fibers are placed in the V-shaped grooves of the V-shaped groove base 34, the height of the V-shaped groove bases 34 is adjusted so that the axis in the direction of the cores of the optical fibers is located in the vicinity of the proper position between electrodes 50 of electrical discharge for optimum fusing of the optical fibers. Moreover, in the case of observing images from two directions, the optical fibers are placed so that the intersection of the image observation optical axes A in two directions is located at the above proper position between the electrodes 50. FIGS. 4A and 4B show the relationship between the electrodes 50 and the image observation optical axes A when the jacket 32 is placed in the V-shaped groove 34a of the V-shaped groove base 34. FIG. 4A indicates the case of a sheath diameter of 250 μm, while FIG. 4B indicates the case of a sheath diameter of 400 μm. In FIG. 4A, a center point O, which is the intersection of image observation optical axes A, is set at the proper electrical discharge position between two stationary electrodes 50, and if the optical fiber core 30 having a sheath diameter of 250 μm is placed on the V-shaped groove base 34 exclusively for use with a sheath diameter of 250 μm and having the V-shaped groove 34a formed therein so that the center of the core 30 coincides with the proper electrical discharge position and the center point O of the image observation optical axes, the image of the end aligned portion 44 can be captured without shifting from the proper position between the electrodes 50 or from the image observation optical axes A in two directions.

When an optical fiber core 30' having a sheath diameter of 400 μm is placed in the V-shaped groove base 34 in this state, as indicated with the broken lines in FIG. 4A, the center position of the optical fiber core 30' moves upward by a height corresponding to the difference in sheath thickness of 75 μm from the center position O of the optical fiber core 30 having a sheath thickness of 250 μm. This height is equal to 75×√2=106 μm in the case the angle formed between the slanted surface of the V-shaped groove 34a in contact with the optical fiber core 30 of the V-shaped groove base 34 and the upper and lower directions of the V-shaped groove 34a is 45 degrees.

Therefore, although it is necessary to move the V-shaped groove base 34 downward by the amount of this height in order to return this center position to the proper electrical discharge position, in the case of the X and Y direction movement mechanism of the V-shaped groove base 34 of the fusion splicer of the prior art, such movement in the vertical direction was difficult for the reasons described below.

Figure 5A:
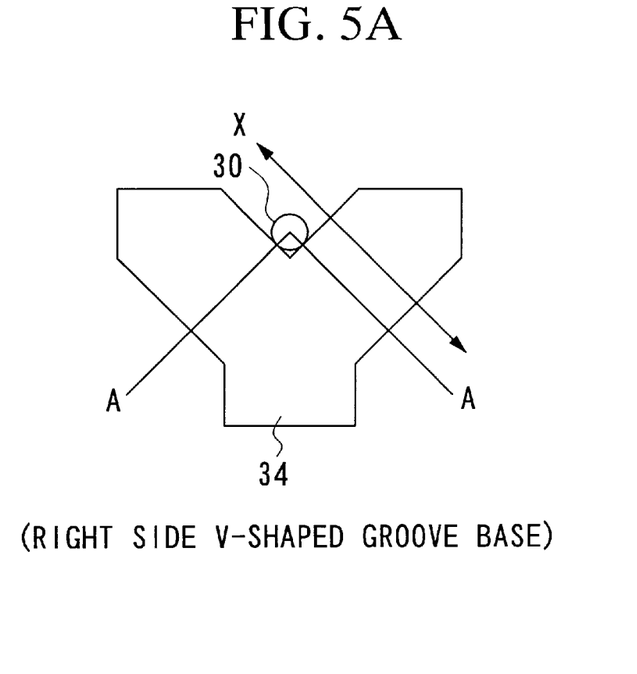
FIG. 5A is a drawing of the right side V-shaped groove base of a fusion splicer of the prior art as viewed from direction B in FIG. 3.
Figure 5B:
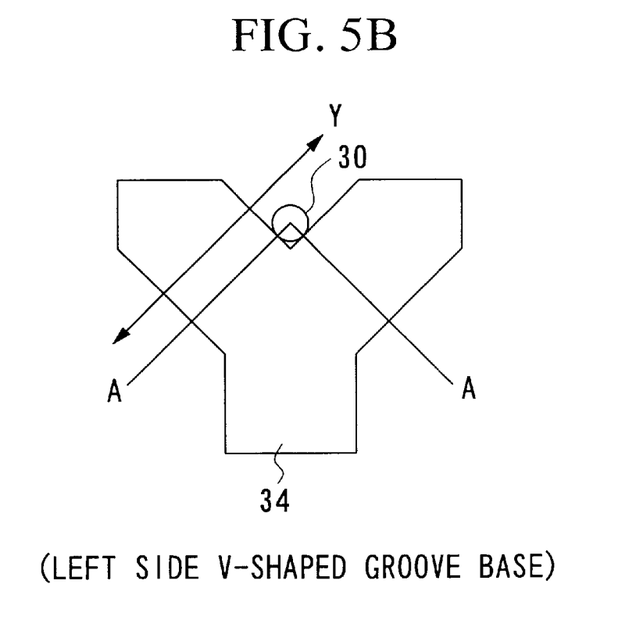
FIG. 5B is a drawing of the left side V-shaped groove base of a fusion splicer of the prior art as viewed from direction B in FIG. 3.

FIGS. 5A and 5B are drawings of the left and right V-shaped groove bases 34 of a fusion splicer of the prior art as viewed from direction B in FIG. 3. As shown in FIGS. 5A and 5B, a V-shaped groove movement mechanism is placed so as to be able to move in two directions of movement of X and Y that are respectively perpendicular to each of the two directions of the image observation optical axes A so that observation images are not shifted out of focus due to the movement of the V-shaped groove 34a.

On the other hand, the two directions of the image observation optical axes A are set so as to be mutually perpendicular to facilitate coordinate conversion during image processing, and the two directions of the image observation optical axes A normally coincide with axial directions X and Y at a right angle which form a 45 degree angle with the vertical direction of the V-shaped groove 34a as shown in FIG. 3. Moreover, the movement mechanism of the left and right V-shaped grooves 34a in which left and right optical fiber cores 30 are respectively placed is normally composed so as to only allow movement in one mutually different direction of movement of the above two directions of movement in order to simplify the drive mechanism.

Thus, since the left and right V-shaped grooves 34a are only able to move in one direction that forms a right angle to the left and right in a direction that forms a 45 degree angle with the vertical direction of the V-shaped grooves 34a, it was difficult to move the left and right optical fiber cores equally in the vertical direction. In addition, in a device equipped only with this type of centering mechanism, it was not possible to correct shifts in the proper electrical discharge position or observation optical axes of 10 μm or more.

In addition, even if the V-shaped groove movement mechanism is not that which only allows movement in one direction for each side of the left and right V-shaped grooves 34a, since the purpose of the movement mechanism is to adjust slight axial shifts of the left and right optical fibers, the distance range over which movement is possible is limited by the movement resolution (on the order of 0.1 μm or less). Since such a mechanism makes movement of several tens of μm or more difficult, movement of several tens of μm or more due to differences in sheath thickness in the vertical direction of the V-shaped groove surface was difficult.

Thus, during optical fiber core 30' having a sheath diameter of 400 μm, it was necessary to either replace the V-shaped groove bases 34 with V-shaped groove bases 34' in which deeper V-shaped grooves 34a' are formed, or move the electrode rods and image observation system in the vertical direction.

However, a material such as ceramics that allows high-precision machining was used for the V-shaped groove bases 34, 34' based on its role of maintaining parallelism and so forth. Thus, the providing of multiple V-shaped groove bases to match variations in sheath diameter was expensive. Moreover, the work involved in replacing the V-shaped groove base 34 required a high level of accuracy, and required an extremely delicate procedure. In addition, although another method for aligning the center of an optical fiber core at the proper electrical discharge position between two electrodes 50 without replacing the V-shaped groove base 34 is known in the prior art in which the electrodes and image observation optical axes are simultaneously moved up and down until they reach the center of the optical fiber core, this makes the overall device complex. Moreover, such a method also has the disadvantages of not being able to be used for splicing fibers having different coating diameters, adjustment being complicated and costs being high.

Figure 6:
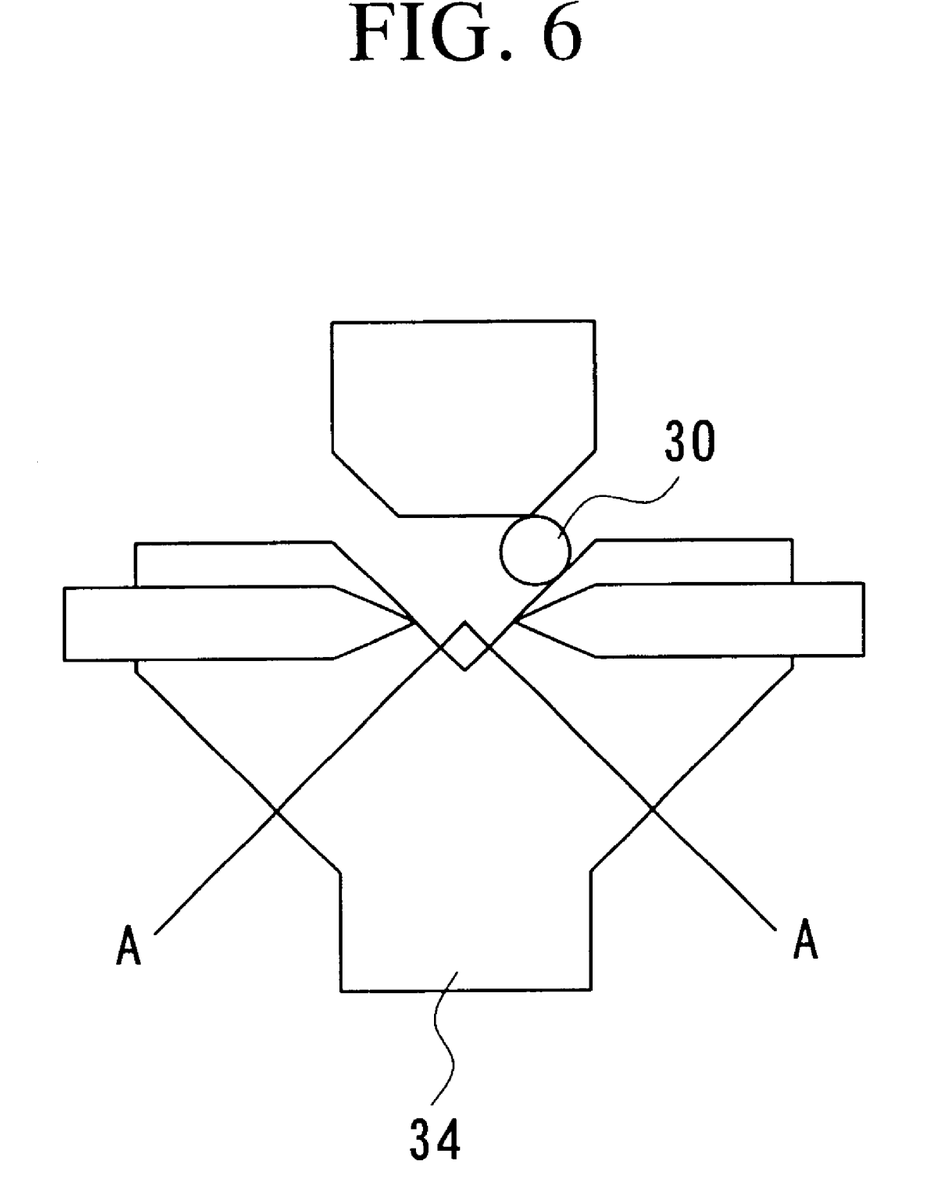
FIG. 6 is a front view of a V-shaped groove showing the phenomenon in which an optical fiber core is lifted along the inside of the V-shaped groove portion.

Moreover, since a material that allows high-precision machining is required to be used for the V-shaped groove base 34 as previously mentioned, if ceramics, for example, is used, the coefficient of friction is comparatively large at 0.6 to 0.8. Consequently, in combination with the sinking action of the sheath due to elastic deformation of the jacket 32, a phenomenon occurs in which the optical fiber core 30 is lifted up on the surface of the V-shaped groove 34a as shown in FIG. 6 during the rotation alignment procedure for constant polarization optical fibers. As a result, the optical fiber core 30 shifts from the image observation optical axis A causing images to be out of focus and resulting in error in analysis of the plane of polarization.

In consideration of the various problems of optical fiber fusion splicers that perform end alignment by the above observation means, the object of the present invention is to provide an optical fiber fusion splicer that enables the axial center of an optical fiber core to be positioned at a suitable electrical discharge position and in the center of an image observation optical axis at all times regardless of the magnitude of the optical fiber diameter, and enables analysis of the plane of polarization to be performed accurately even if a phenomenon involving lifting up of the optical fiber core occurs during rotation alignment of a constant polarization optical fiber.

SUMMARY OF THE INVENTION

In order to achieve the object, an optical fiber fusion splicer of the present invention equipped with: a V-shaped groove base that respectively fixes and clamps left and right optical fibers in a V-shaped groove and a clamp for fixing optical fibers in the V-shaped groove, an observation means for observing the left and right optical fibers from the side, a V-shaped groove movement mechanism that aligns the end surfaces of optical fibers by performing axial alignment of the left and right optical fibers based on observation information from the observation means, and electrodes that generate an electrical discharge at the aligned portions to fuse and join them; wherein, a V-shaped groove base vertical movement means is provided that moves the V-shaped groove base up and down so that the centers of the axes of the optical fibers are positioned at the proper location for electrical discharge corresponding to the magnitude of the optical fiber diameter.

According to this optical fiber fusion splicer, although the position of the axis center of the optical fiber core changes relative to the V-shaped groove depending on the magnitude of sheath diameter, since the V-shaped groove base that holds the core is moved up and down according to that sheath diameter, the axis center of the core can be positioned at the proper position for electrical discharge. Thus, end alignment work can be performed reliably without the axis center shifting from the proper position for electrical discharge using only a simple mechanism in the form of the V-shaped groove base vertical movement means.

In the optical fiber fusion splicer, it is preferable that the observation means has observation axes in two directions which mutually form a right angle, the intersection of the observation axes in two directions is located at the proper location for the electrical discharge, and the V-shaped groove movement mechanism has a means for moving at least one of either of the left and right optical fibers in a direction that forms a right angle with the observation axes in two directions.

According to this optical fiber fusion splicer, since the V-shaped groove base that holds the core is moved up and down corresponding to sheath diameter, the axis center of the core can be aligned with the image observation optical axis. Thus, end alignment can be performed reliably without the axis center shifting from the image observation optical axis using only a simple mechanism in the form of the vertical movement mechanism of the V-shaped groove base.

Furthermore, in the optical fiber fusion splicer, a rotation mechanism for rotating the axis of the optical fiber, and a means which can separately move up and down the V-shaped groove base and the clamp relative to the surface of the V-shaped groove corresponding to information from a lateral observation means during optical fiber rotation, can be provided.

According to this optical fiber fusion splicer, when the phenomenon of fiber lift-up is captured by the observation means during rotation alignment of a constant polarization optical fiber core, since the optical fiber core is re-clamped after temporarily moving the clamp upward and the V-shaped groove base downward, the lift-up phenomenon can be eliminated thereby enabling analysis of the plane of polarization to be performed accurately.

DETAILED DESCRIPTION OF THE PREFERRED EMBODIMENTS

Figure 1A:
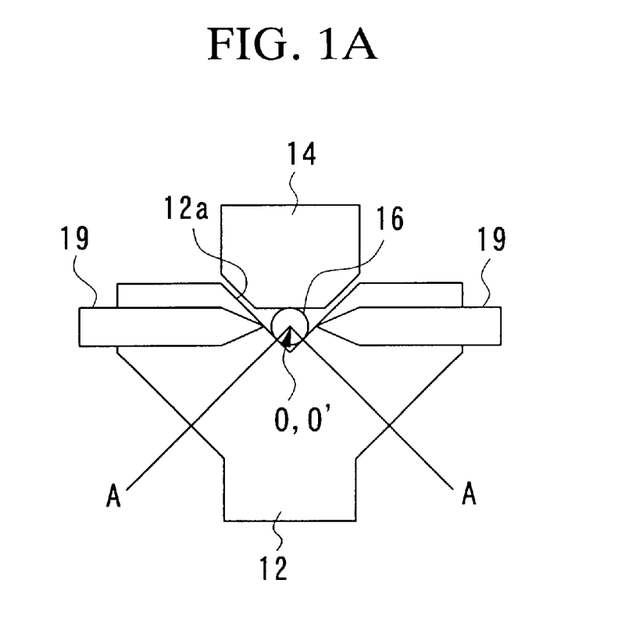
FIG. 1A is a front view of a V-shaped groove for explaining the proper position of the V-shaped groove base of the present invention, and shows the position of the V-shaped groove base when a sheath diameter of 250 μm is clamped,.
Figure 1B:
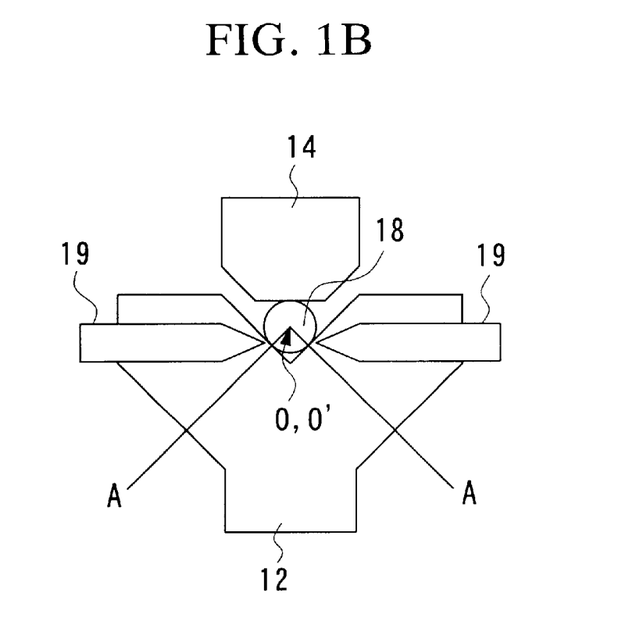
FIG. 1B is a front view of a V-shaped groove for explaining the proper position of the V-shaped groove base of the present invention, and shows the position of the V-shaped groove base when a sheath diameter of 400 μm is clamped.

The following provides an explanation of an embodiment of the present invention based on FIGS. 1 and 2. FIGS. 1A and 1B are front views of a V-shaped groove which showing the state in which an optical fiber is clamped between a V-shaped groove base and a clamp of an optical fiber fusion splicer for explaining the proper amount of movement of the V-shaped groove base. The constitution is the same as the optical fiber fusion splicer explained in the prior art with the exception of a V-shaped groove base vertical movement means (not shown). FIG. 1A showing the position of the V-shaped groove base when a sheath diameter of 250 μm is clamped, and FIG. 1B showing the position of the V-shaped groove base when a sheath diameter of 400 μm is clamped. In FIG. 1A, the optical fiber core 16 having a sheath diameter of 250 μm is placed in the V-shaped groove 12a of the V-shaped groove base 12, and is clamped from above by the clamp 14. The V-shaped groove base 12 is positioned so that a center O of an image observation optical axis A is at the proper electrical discharge position of electrodes 19, and so that a center O' of the optical fiber core 16 coincides with the center O of the image observation optical axis A and the optical fiber core is positioned in the center of the image on a two-directional image observation screen. Next, when the optical fiber core 18 having a sheath diameter of, for example, 400 μm is placed in the same V-shaped groove 12a for fusion splicing, since the center of the sheath diameter is positioned higher than the proper electrical discharge position, when the V-shaped groove base 12 is moved so that it is positioned at the center O of image observation optical axis A, the V-shaped groove base 12 shown in FIG. 1B is moved downward by (400−250)/√2=106 μm from the position of V-shaped groove base 12 shown in FIG. 1A. Consequently, the center O of the optical fiber core 18 is positioned at the center O of the image observation optical axis A, namely at the proper electrical discharge position, by moving the V-shaped groove base 12 shown in FIG. 1B downward by the above 106 μm from the position of the V-shaped groove base 12 shown in FIG. 1A. Here, the clamp 14 is installed so as to continue to clamp the optical fiber core 18 within the V-shaped groove portion 12a irrespective of the vertical movement of the V-shaped groove base 12 as long as a releasing procedure is not performed. In this manner, by moving the V-shaped groove base 12 up and down by the V-shaped groove base vertical movement means in the state in which it continues to clamp the optical fiber core corresponding to the magnitude of sheath diameter based on the position of V-shaped groove base 12 when the center of the core with a certain sheath diameter is aligned with the center of the image observation optical axis, namely the proper electrical discharge position, the center of the optical fiber core, the proper electrical discharge position and optical axis center can be aligned for the core having any sheath diameter. Next, fusion and splicing are performed by electrical discharge of the electrodes 19 following the axial alignment of the optical fiber cores using image processing and a V-shaped groove drive mechanism moves optical fiber cores along X, Y direction.

Here, even if a 400 μm optical fiber core is placed at the default position of the V-shaped groove base during image processing, it is necessary to widen the image observation range from the alignment range relative to a sheath diameter of 250 μm so that said core does not protrude from the screen. This can be accommodated by, for example, changing the magnification factor of the microscope 40. In addition, the clamp may also be replaced corresponding to the sheath diameter. (Furthermore, even if the clamp is replaced, the cost is much less in comparison with replacing the V-shaped groove base.)

Furthermore, in the case the covering diameter of the optical fiber core is known, the optical fiber core can also be positioned at the proper electrical discharge position by moving the V-shaped groove base by the difference in covering diameter without relying on image processing as described above.

Moreover, although the explanation of the above example applied to the case of clamping the jackets of the optical fiber cores having different diameters, the present invention is not limited to this, but rather can also be applied to the case of, for example, clamping a bare optical fiber with the same V-shaped groove.

In order to accommodate fibers having different sheath diameters with the same V-shaped groove in the manner described above, it is preferable that the stroke of the V-shaped groove vertical movement be 40 μm or more. In addition, if composing so that, for example, the V-shaped groove can be moved up and down using the V-shaped groove base vertical movement means having a full stroke of 580 μm, a bare optical fiber having an outer diameter of 80 μm to a covered optical fiber core having a covering diameter of 900 μm can be accommodated with the same V-shaped groove.

Figure 2A:
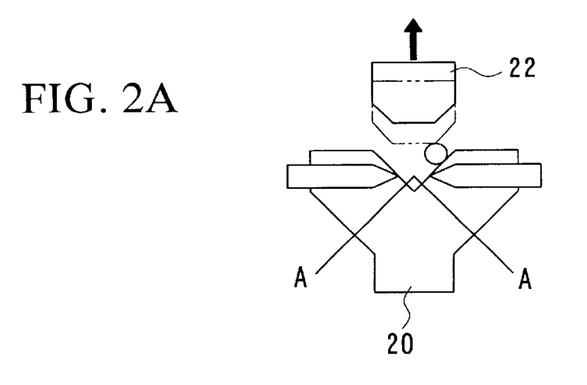
FIG. 2A is a front view of a V-shaped groove for explaining the V-shaped groove movement procedure during fiber is lifted up, and shows the state in which the clamp is raised.
Figure 2B:
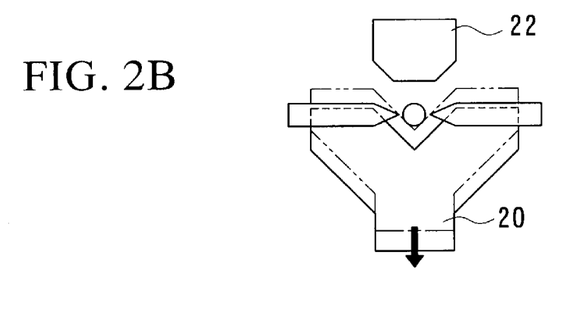
FIG. 2B is a front view of a V-shaped groove for explaining the V-shaped groove movement procedure during fiber is lifted up, and shows the state in which the clamp is lowered.
Figure 2C:
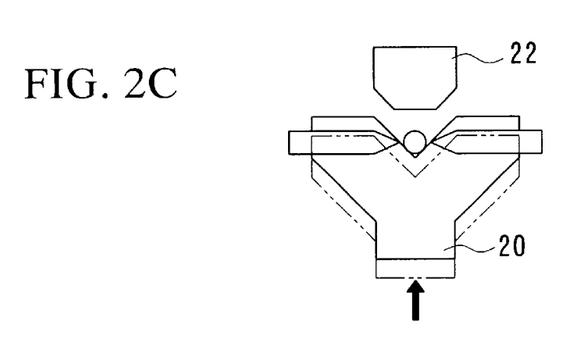
FIG. 2C is a front view of a V-shaped groove for explaining the V-shaped groove movement procedure during fiber is lifted up, and shows the state in which the V-shaped groove base is raised.
Figure 2D:
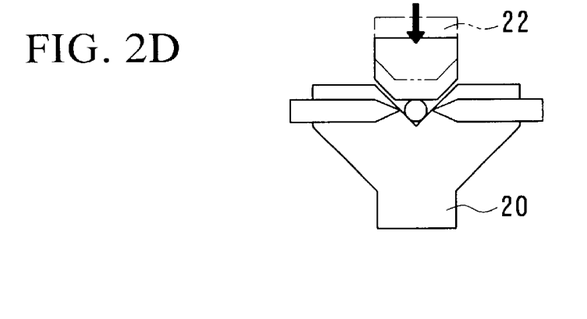
FIG. 2D is a front view of a V-shaped groove for explaining the V-shaped groove movement procedure during fiber is lifted up, and shows the state in which the clamp is lowered.

Next, an explanation is provided of a V-shaped groove movement mechanism of the fusion splicer for constant polarization optical fibers of the present invention. FIGS. 2A to 2D show front views of a V-shaped groove for explaining the V-shaped groove movement procedure of the present invention. FIG. 2A shows a lift-up phenomenon of the optical fiber core that occurs during a rotation alignment procedure for a constant polarization optical fiber. In the case of using ceramics for a V-shaped groove base 20, this lift-up phenomenon is thought to occur as a result of the coefficient of friction with the jacket of the core being comparatively large at 0.6 to 0.8, and the occurrence of sinking due to elastic deformation of the sheath. Once this lift-up phenomenon occurs, the serious problem results in which images cannot be observed and the plane of polarization cannot be analyzed. In the present invention, however, when the lift-up phenomenon is detected by image processing, as shown in FIG. 2A, a clamp 22 is temporarily raised to a position at which it does not make contact with the fiber sheath. The amount of this rise is, for example, about 0.5 mm in the case the Z axis inclination is 5 degrees in a PAS (Profile Alignment System) type of fusion splicer. Next, as shown in FIG. 2B, the V-shaped groove base 20 is lowered to a position where it does not make contact with the fiber sheath. In this case as well, the amount of lowering is about 0.5 mm in the case the Z axis inclination is 5 degrees in a PAS type of fusion splicer. Subsequently, as shown in FIG. 2C, the V-shaped groove base 20 is returned to its original position followed by lowering the clamp 22 to its original position as shown in FIG. 2D. In this manner, by moving the clamp 22 and the V-shaped groove base 20 when the lift-up phenomenon occurs in a core, the alignment operation can be performed again without changing the image observation position. Moreover, since the position of the fiber is not shifted, there is no misinterpretation of the direction of the plane of polarization in image analysis.

Although various mechanisms can be considered for the V-shaped groove base vertical movement mechanism of the optical fiber fusion splicer of the present invention, it is necessary that the V-shaped groove base be able to move up and down relative to the discharge electrodes and observation optics. At this time, the left and right V-shaped groove bases may be moved up and down simultaneously, or may be moved up and down individually. In the latter case, fusion and splicing can be performed while clamping an optical fiber having different outer diameters on the left and right sides at the optimum position.

Furthermore, the optical fiber fusion splicer of the present invention is naturally not limited to the optical fiber fusion splicer of the above embodiment. For example, the direction of the image observation axis and the direction of movement of the V-shaped groove base during axial alignment may form an angle of 45 degrees with respect to the vertical direction of the V-shaped groove, or may also be, for example, either 0 degrees or 90 degrees. In addition, the V-shaped groove base movement mechanism during axial alignment may be such that one of the V-shaped groove bases is fixed while the other is moved in two directions without moving both the left and right V-shaped groove bases. Moreover, the V-shaped groove base movement mechanism during axial alignment may be such that the inclined surface of the V-shaped groove is moved in one direction without moving the entire V-shaped groove base, resulting in movement of the optical fiber.

What is claimed is:

1. An optical fiber fusion splicer comprising: a V-shaped groove base that respectively fixes and clamps left and right optical fibers in a V-shaped groove and a clamp for fixing optical fibers in a V-shaped groove, an observation means for observing said left and right optical fibers from the side, a V-shaped groove movement mechanism that aligns the end surfaces of optical fibers by performing axial alignment of said left and right optical fibers based on observation information from said observation means, and electrodes that generate an electrical discharge at the aligned portions to fuse and join them;

wherein, a V-shaped groove base vertical movement means is provided that moves said V-shaped groove base up and down so that the centers of the axes of said optical fibers are positioned at the proper location for electrical discharge corresponding to the magnitude of optical fiber diameter.

2. An optical fiber fusion splicer according to claim 1 wherein, said observation means has observation axes in two directions that mutually form a right angle, the intersection of said observation axes in two directions is located at the proper location for said electrical discharge, and said V-shaped groove movement mechanism has a means for moving at least one of either of said left and right optical fibers in a direction that forms a right angle with said observation axes in two directions.

3. An optical fiber fusion splicer according to claim 1, comprising a rotation mechanism that rotates the axis of an optical fiber, and a means that is able to respectively and separately move up and down said V-shaped groove base and said clamp relative to the surface of the V-shaped groove corresponding to information from a lateral observation means during optical fiber rotation.

4. An optical fiber fusion splicer according to claim 2, comprising a rotation mechanism that rotates the axis of an optical fiber, and a means that is able to respectively and separately move up and down said V-shaped groove base and said clamp relative to the surface of the V-shaped groove corresponding to information from a lateral observation means during optical fiber rotation.

* * * * *